(12) United States Patent
Dominguez et al.

(10) Patent No.: US 11,371,612 B2
(45) Date of Patent: Jun. 28, 2022

(54) SLEEVE FOR A SEAL ASSEMBLY

(71) Applicant: AKTIEBOLAGET SKF, Gothenburg (SE)

(72) Inventors: John M. Dominguez, Elgin, IL (US); Matthew Schweig, North Aurora, IL (US)

(73) Assignee: AKTIEBOLAGET SKF, Gothenburg (SE)

( * ) Notice: Subject to any disclaimer, the term of this patent is extended or adjusted under 35 U.S.C. 154(b) by 147 days.

(21) Appl. No.: 16/869,113

(22) Filed: May 7, 2020

(65) Prior Publication Data

US 2021/0348687 A1 Nov. 11, 2021

(51) Int. Cl.
*F16J 15/322* (2016.01)
*F16J 15/3232* (2016.01)
*F16J 15/34* (2006.01)

(52) U.S. Cl.
CPC ......... *F16J 15/322* (2013.01); *F16J 15/3232* (2013.01); *F16J 15/3404* (2013.01)

(58) Field of Classification Search
CPC .... F16J 15/00; F16J 15/16; F16J 15/50; F16J 15/52; F16J 15/32; F16J 15/3204; F16J 15/3208; F16J 15/3212; F16J 15/322; F16J 15/3232; F16J 15/3236; F16J 15/34; F16J 15/3404; F16J 15/3408
USPC ........................................................ 277/549
See application file for complete search history.

(56) References Cited

U.S. PATENT DOCUMENTS

| | | | | |
|---|---|---|---|---|
| 4,856,794 | A * | 8/1989 | Boyers | F16J 15/3268 277/571 |
| 5,186,472 | A * | 2/1993 | Romero | F16J 15/3256 277/351 |
| 6,450,503 | B1 * | 9/2002 | Dossena | F16J 15/3256 277/549 |
| 7,658,386 | B2 * | 2/2010 | Oldenburg | F16J 15/3256 277/572 |
| 8,439,363 | B2 * | 5/2013 | Greca | F16J 15/3256 277/353 |
| 9,133,937 | B1 * | 9/2015 | Reimer | F16J 15/3232 |

* cited by examiner

*Primary Examiner* — Nathan Cumar
(74) *Attorney, Agent, or Firm* — J-Tek Law PLLC; Scott T. Wakeman; Mark A. Ussai (57) ABSTRACT

A sleeve for a lip seal assembly includes a rigid portion with a tubular section having an inner surface defining a bore for receiving a shaft and an outer surface providing a seal engagement surface, and a radial flange extending from an axial end of the tubular section. An elastomeric portion attached to the rigid portion has a tubular section disposed within the rigid portion bore and a lip extending axially outwardly from one axial end of the tubular section so as to be disposed externally of the rigid portion bore and having a sealing surface engageable with the shaft outer surface, and may have another lip extending axially from the opposing axial end. The axial lip(s) reduce installation forces, retain lubricant within the sleeve bore during shipping, handling, test shaft and plug installation and removal, and final shaft assembly, and the air side lip prevents leakage of assembly lubricant.

19 Claims, 7 Drawing Sheets

SLEEVE FOR A SEAL ASSEMBLY

BACKGROUND OF THE INVENTION

The present invention relates to seal assemblies, and more particularly to sleeves for radial lip seal assemblies.

Radial lip seals are generally known and typically include an outer case and an annular elastomeric sealing member with a circumferential lip sealingly engageable with a shaft or a housing. In certain "unitized" constructions, the seal assembly further includes an inner sleeve that is rotatably coupleable with the shaft and provides an engagement surface for the sealing member. The sleeve enables the seal assembly to be provided as an enclosed unit that protects the sealing member during transportation and assembly and better prevents contaminants from entering a seal interface.

SUMMARY OF THE INVENTION

In one aspect, the present invention is a sleeve for a unitized radial lip seal assembly for sealing an annular space between a shaft and a housing, the shaft having an outer circumferential surface and the seal assembly including an annular primary sealing lip. The sleeve comprises a rigid portion including a tubular section, the tubular section having opposing first and second axial ends, an inner circumferential surface defining a bore for receiving the shaft and an outer circumferential surface providing an engagement surface for the primary sealing lip, and a radial flange extending from the first axial end of the tubular section. An elastomeric portion is attached to the rigid portion and includes a tubular section, the elastomeric portion tubular section being disposed within the rigid portion bore and having an inner circumferential surface disposeable about the shaft outer surface and opposing first and second axial ends. A lip extends axially outwardly from the first axial end of the tubular section so as to be substantially disposed externally of the rigid portion bore and has an inner circumferential sealing surface sealingly engageable with the shaft outer surface.

In another aspect, the present invention is a unitized radial lip seal assembly for sealing an annular space between a shaft and a housing, the shaft having an outer circumferential surface and the housing having an inner circumferential surface defining a bore. The seal assembly comprises an outer case having an outer annular portion coupleable with the housing and a radially-inwardly extending flange portion. A primary sealing lip is coupled with the flange portion of the case. An inner sleeve is disposeable about the shaft and comprises a rigid portion including a tubular section, the tubular section having opposing first and second axial ends, an inner circumferential surface defining a bore and an outer circumferential surface providing an engagement surface for the primary sealing lip, and a radial flange extending from the first axial end of the tubular section. An elastomeric portion is attached to the rigid portion and includes a tubular section, the elastomeric portion tubular section being disposed within the rigid portion bore and having an inner circumferential surface disposeable about the shaft outer surface and opposing first and second axial ends. Further, a lip extends axially outwardly from the first axial end of the tubular section so as to be substantially disposed externally of the rigid portion bore and having an inner circumferential sealing surface sealingly engageable with the shaft outer surface.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

DETAILED DESCRIPTION OF THE INVENTION

Certain terminology is used in the following description for convenience only and is not limiting. The words "inner", "inwardly" and "outer", "outwardly" refer to directions toward and away from, respectively, a designated centerline or a geometric center of an element being described, the particular meaning being readily apparent from the context of the description. Further, as used herein, the words "connected" and "coupled" are each intended to include direct connections between two members without any other members interposed therebetween and indirect connections between members in which one or more other members are interposed therebetween. The terminology includes the words specifically mentioned above, derivatives thereof, and words of similar import.

Figure 1:
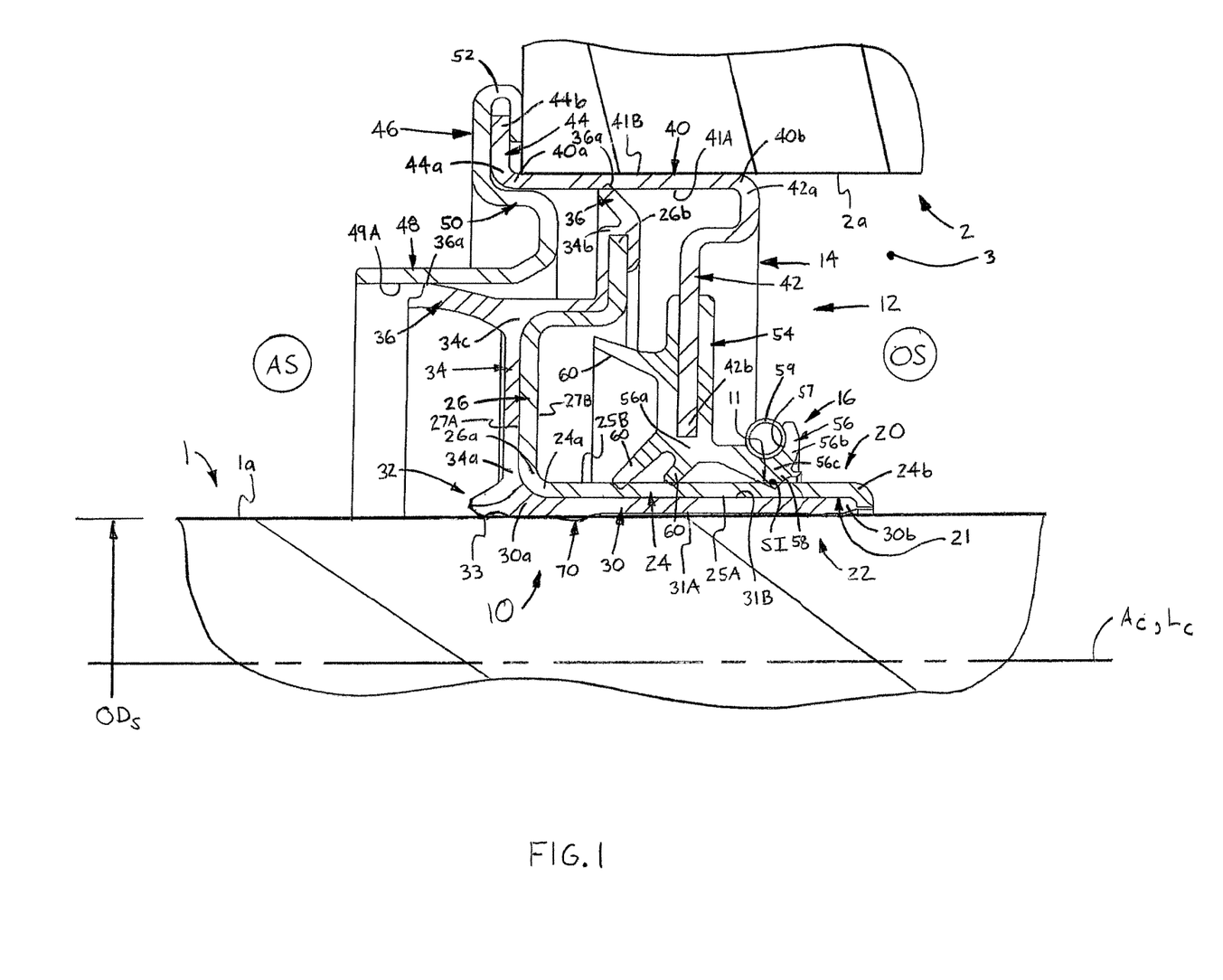
FIG. 1 is a broken-away, axial cross-sectional view of a first construction of a sleeve shown incorporated in seal assembly and installed on a shaft and within a housing.

Referring now to the drawings in detail, wherein like numbers are used to indicate like elements throughout, there is shown in FIGS. 1-11 a sleeve 10 for a unitized radial lip seal assembly 12 for sealing an annular space (not indicated) between a shaft 1 and a housing 2. The shaft 1 is rotatable about a central axis $A_C$ and has an outer circumferential surface 1a, and the housing 2 has an inner circumferential surface 2a defining a bore 3 (FIG. 1). Further, the seal assembly 12 comprises an outer case 14 coupleable with the housing 2, an elastomeric primary sealing member 16 coupled with the case 14, and the sleeve 10, which is disposed within the case 14 and mountable about the shaft 1.

The sleeve 10 basically comprises an outer rigid portion 20 and an inner elastomeric portion 22 disposed partially within the rigid portion 20. The rigid portion 20 includes a tubular section 24 with a bore 21 for receiving the shaft 1 and a radial flange 26 extending outwardly from the tubular section 24. More specifically, the tubular section 24 has opposing first and second axial ends 24a, 24b, respectively, an inner circumferential surface 25A defining the bore 21, and an outer circumferential surface 25B providing an engagement surface 11 for the primary sealing lip 16, the engagement of the lip 16 with the surface 11 defining a primary seal interface SI. Further, the radial flange 26 has an inner radial end 26a integrally formed with the first axial end 24a of the tubular section 24, an outer radial end 26b and opposing radial surfaces 27A, 27B extending between the ends 26a, 26b.

Further, the elastomeric portion 22 includes a tubular section 30 and at least one axial sealing lip 32 connected with the tubular section 30, and preferably also includes a radial section 34 extending outwardly from the tubular section 30. The tubular section 30 is disposed within the rigid portion bore 21 and has an inner circumferential surface 31A disposeable about the shaft outer surface 1a, an outer circumferential surface 31B attached to the inner surface 25A of the rigid tubular section 24 and opposing first and second axial ends 30a, 30b, respectively. The inner surface 31A of the elastomeric tubular section 30 is frictionally engaged with the shaft outer surface 1a, preferably through one or more annular sealing beads 70 and/or axial ribs 72 as described below, so as to rotatably couple the sleeve 10 with the shaft 1 (i.e., the sleeve 10 rotates with the shaft 1 about the axis $A_C$). Further, the sealing lip 32 extends axially outwardly from the first axial end 30a of the tubular section 30 so as to be substantially disposed externally of the rigid portion bore 21. The lip 32 has an inner circumferential sealing surface 33 sealingly engageable with the shaft outer surface 1a to prevent fluid from passing outwardly from the sleeve 10, as discussed below.

With the above structure, the sleeve 10 is configured to be positioned on the shaft 1 such that the lip 32 of the elastomeric portion 22 is located on an air side AS of the seal assembly 12. Specifically, the primary sealing member 16 engages a central region on the outer surface 25B of the rigid tubular section 24 such that the first axial ends 24a, 30a of the sleeve tubular sections 24, 30 are located on the seal air side AS and the second axial ends 24b, 30b of the tubular sections 24, 30 are located on a liquid or "oil" side OS of the seal assembly 12. Being so oriented, the lip 32 prevents any fluid (e.g., oil, grease, etc.) leaking between the elastomeric tubular section 30 of the sleeve 10 and the shaft 1 from passing from the oil side OS to the air side AS. Further, being located externally of the rigid member bore 21, the lip 32 is designed to be in tension when installed on the shaft 1 as discussed below, and as such, the lip 32 more effectively seals over the entire product life of the sleeve 10 as compared to "compressed" sealing portions of the sleeve 10. Having described the basic structure and functions above, these and other components of the present sleeve 10 and sealing assembly 12 are described in greater detail below.

Figure 2:
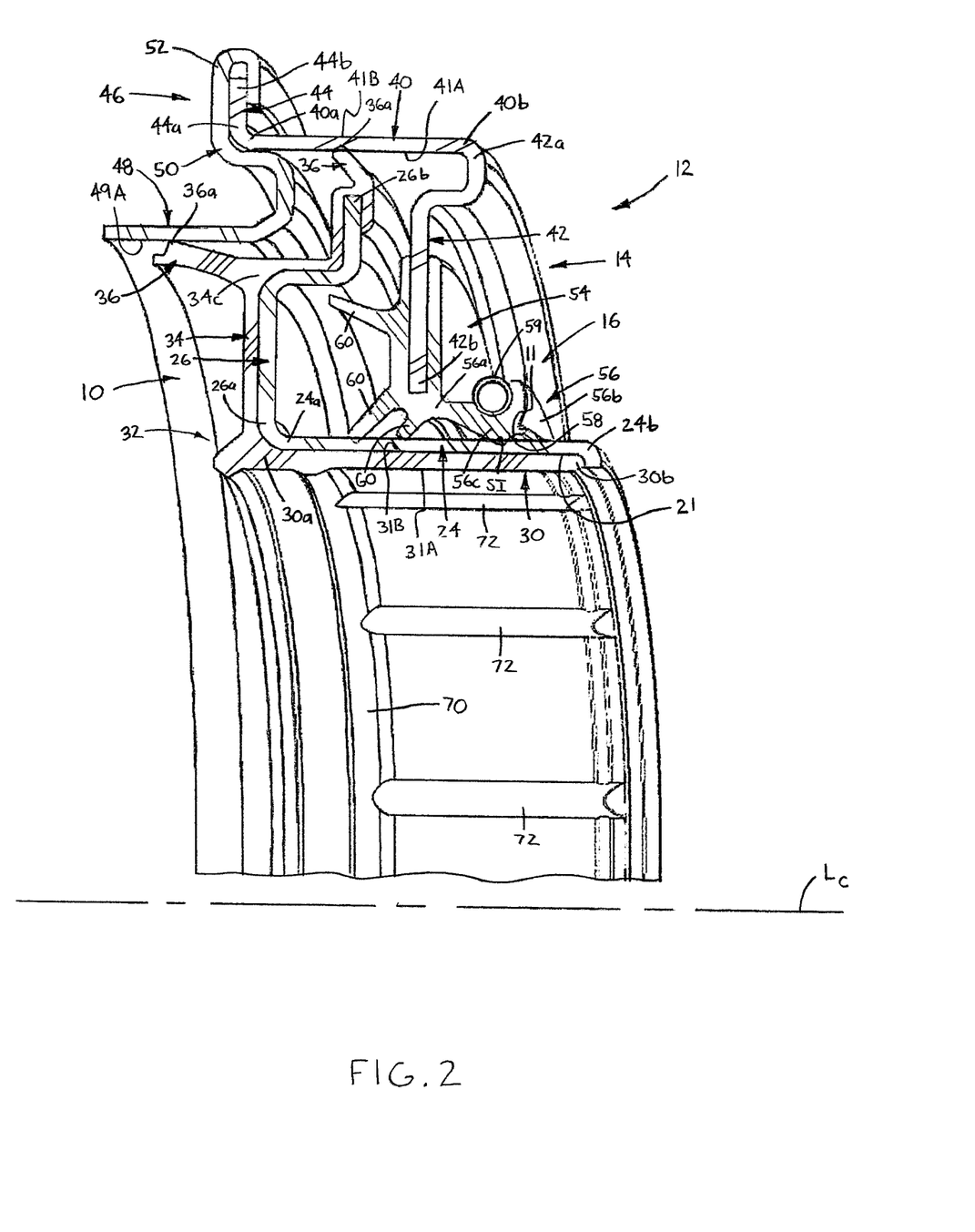
FIG. 2 is a broken-away, axial cross-sectional view in perspective of the sleeve and seal assembly of FIG. 1.
Figure 3:
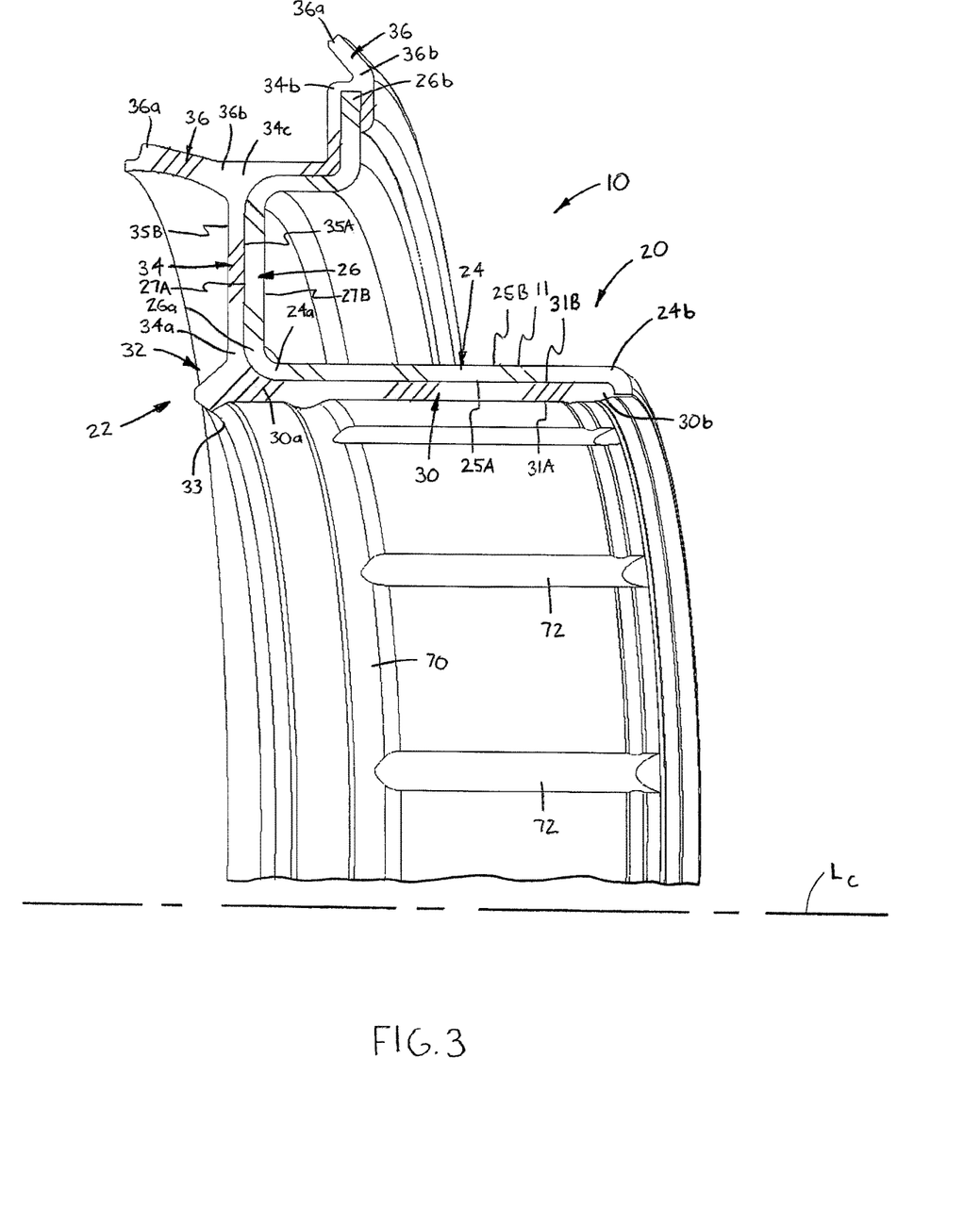
FIG. 3 is a broken-away, axial cross-sectional view in perspective of the first construction sleeve.

Referring now to FIGS. 1 and 2, the outer case 14 of the seal assembly 12 preferably includes an annular axial portion 40 and at least one inwardly-extending or "inner" radial flange 42. The axial portion 40 has opposing axial ends 40a, 40b and inner and outer circumferential surfaces 41A, 41B, respectively, the outer surface 41B being frictionally engageable with the housing inner surface 2a. The inner radial flange 42 has an outer radial end 42a integrally formed with one axial end 40b and a free, inner radial end 42b for mounting the primary sealing member 16, as described below. Preferably, the case 14 also includes an outwardly-extending or "outer" flange 44 having an inner radial end 44a integrally formed with the other axial end 40a of the case axial portion 40 and an opposing outer radial end 44b.

Preferably, the seal assembly 12 further includes a closure member 46 coupled with the case outer flange 44 and configured to enclose the air side AS of the seal assembly 12. Specifically, the closure member 46 includes an inner axial section 48 with an inner circumferential surface 49A for engagement with a dust lip 36 of the sleeve 10, as described below, and an outer radial portion 50 with a hook section 52. The hook section 52 is engageable over the outer radial end 44b of the case outer radial flange 44 so as to couple the closure member 46 with the case 14.

Further, the sealing member 16 preferably includes a circular plate-like base portion 54 coupled with, and most preferably molded to, the inner end 42b of the case inner radial flange 42 and an annular cantilever seal portion 56 extending axially from the base portion 54. The annular seal portion 56 has a first end 56a integrally formed with the base portion 54, an opposing free end 56b and a wedge-shaped inner section 56c providing an inner circumferential sealing lip 58. The seal portion 56 also has an outer circumferential groove 57 and a garter spring 59 is disposed within the groove 57 to bias the sealing lip 58 radially inwardly and against the rigid member engagement surface 11. Further, the sealing member 16 also preferably includes a plurality of dust lips 60 extending from the base portion 54 and engaged with or located adjacent to, sections of the sleeve rigid portion 20.

Referring to FIGS. 1-8, the sleeve 10 has a centerline $L_C$ and the each of the tubular sections 24, 30 of the rigid and elastomeric portions 20, 22, respectively, is preferably generally circular and disposed coaxially about the centerline $L_C$. The rigid portion 20 of the sleeve 10 is preferably formed of a metallic material, such as aluminum, low carbon steel, etc. and the elastomeric portion 22 is preferably formed of natural or synthetic rubber and is preferably attached to rigid portion 20 by molding or bonding. However, either portion 20 and/or 22 may be formed of any appropriate material, such as the rigid portion 20 being formed of a ceramic or rigid polymeric material, and attached together by any appropriate means, e.g., fasteners, a friction fit, etc.

Figure 9:
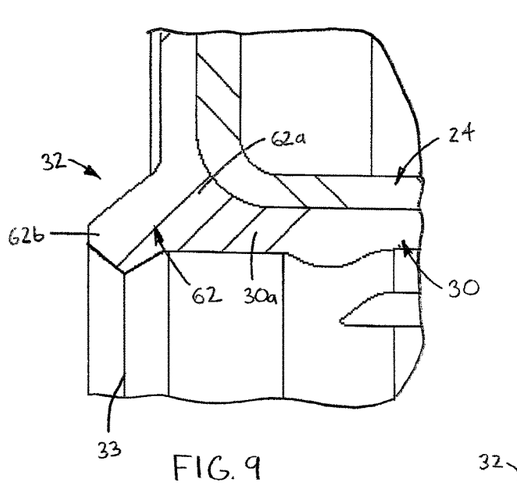
FIG. 9 is an enlarged, broken-away portion of a wiper lip of the first construction sleeve.
Figure 10:
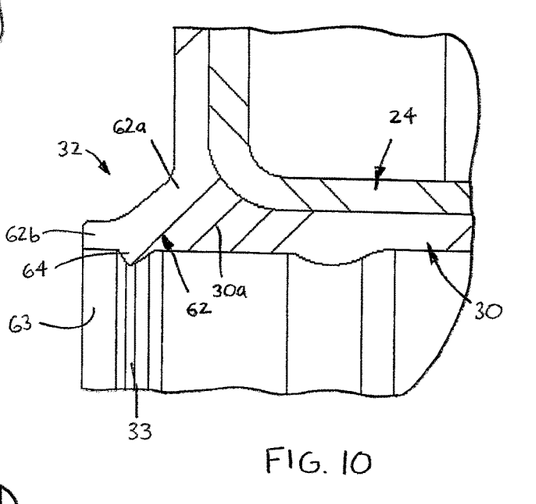
FIG. 10 is an enlarged, broken-away portion of the wiper lip of the second construction sleeve.
Figure 11:
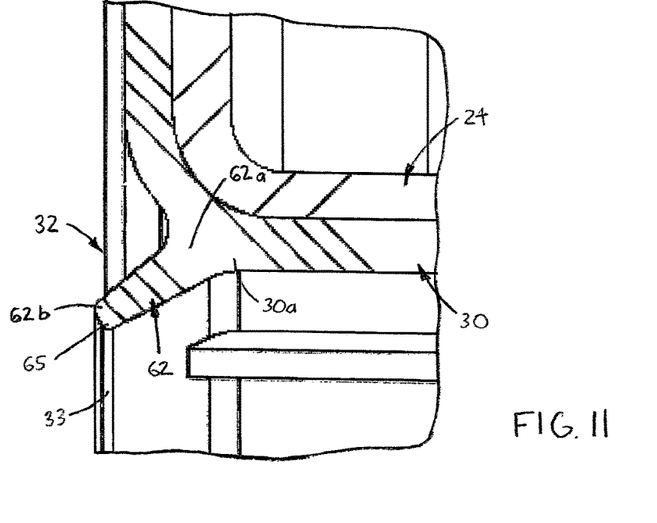
FIG. 11 is an enlarged, broken-away portion of the wiper lip of the third construction sleeve.

As best shown in FIGS. 9-11, the at least sealing lip 32 of the sleeve 10 preferably includes a cantilever-like annular body 62 having an inner end 62a integrally formed with the first axial end 30a of the elastomeric tubular section 30 and an opposing, free outer axial end 62b. The cantilever free end 62b is spaced axially outwardly from the first axial end 30a of the tubular section 30 and provides the lip sealing surface 33. In a first preferred construction, the lip body 62 is generally wedge-shaped and the sealing surface 33 is formed directly on the lip free end 62b, as shown in FIG. 9. In a second preferred construction, the lip 32 has a generally cylindrical inner surface 63 (i.e., non-tapered) and has a generally triangular annular bead 64 spaced inwardly from the free end 62b and providing the sealing surface 33, as depicted in FIG. 10. In a third preferred construction, the cantilever-like body 62 is generally frustoconical and tapers radially inwardly from the inner axial end 62a to the free, outer axial end 62b, with the sealing surface 33 being provided by a relatively narrow tip 65 of the free end 62b, as shown in FIG. 11.

Figure 4:
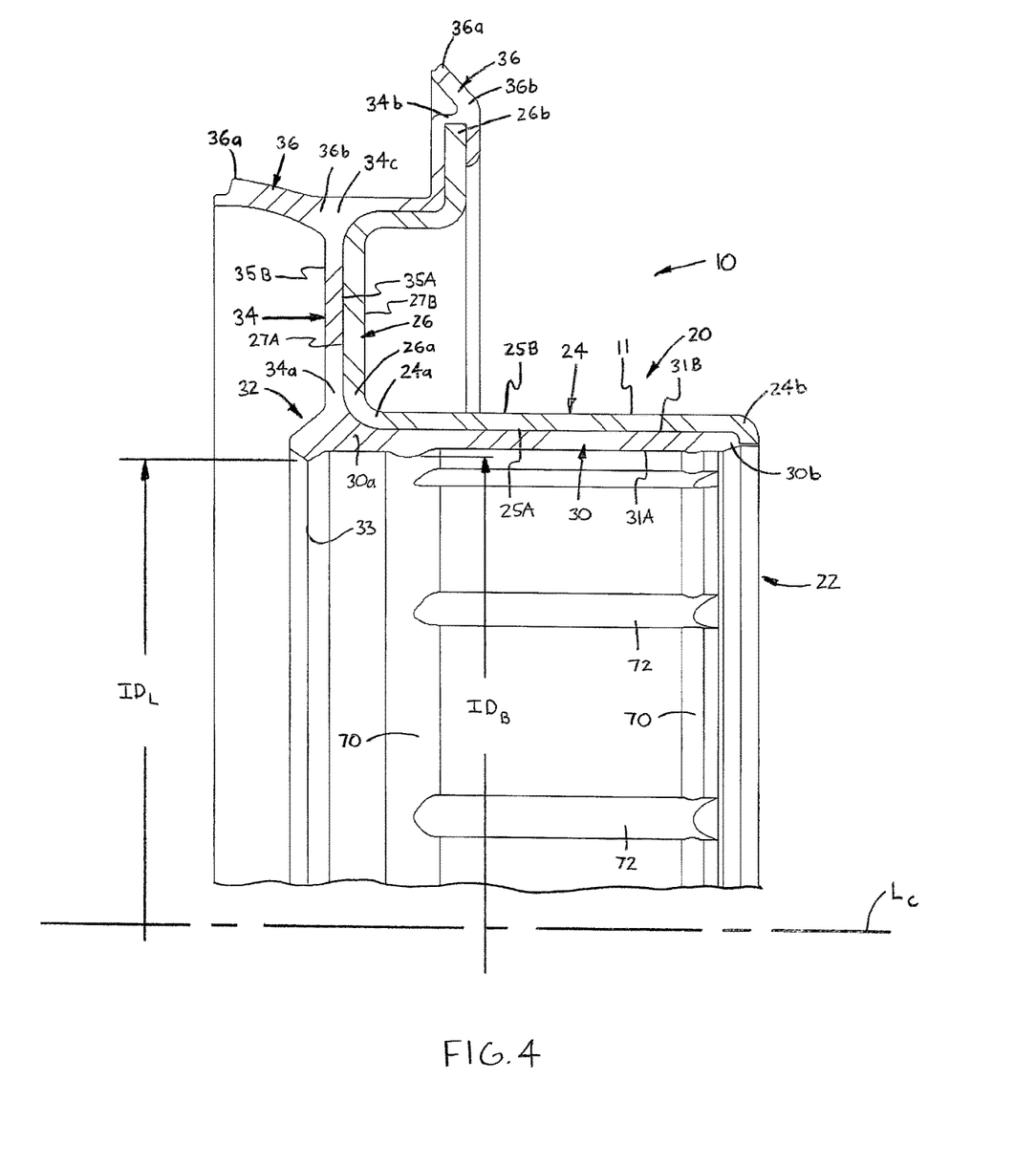
FIG. 4 is a broken-away, axial cross-sectional view of the first construction sleeve.
Figure 5:
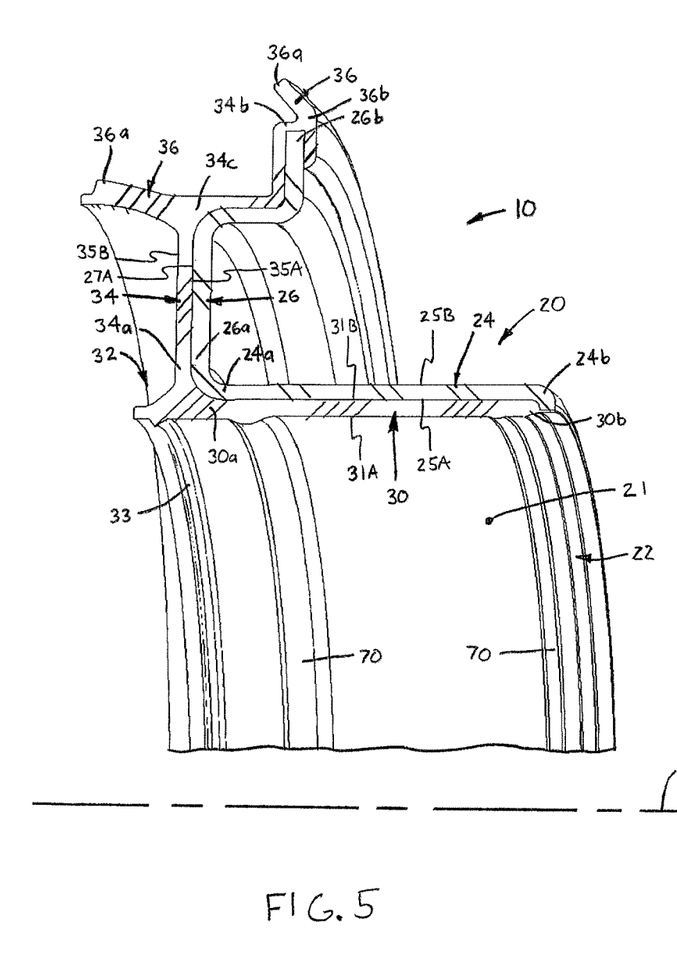
FIG. 5 is a broken-away, axial cross-sectional view in perspective of a second construction of the sleeve.
Figure 6:
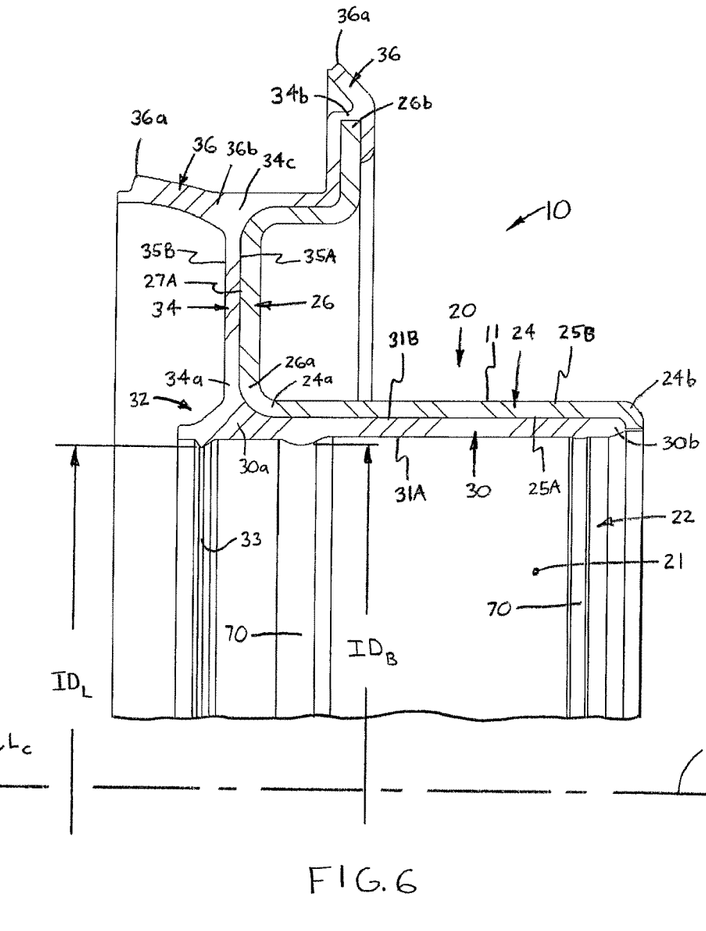
FIG. 6 is a broken-away, axial cross-sectional view of the second construction sleeve.
Figure 8:
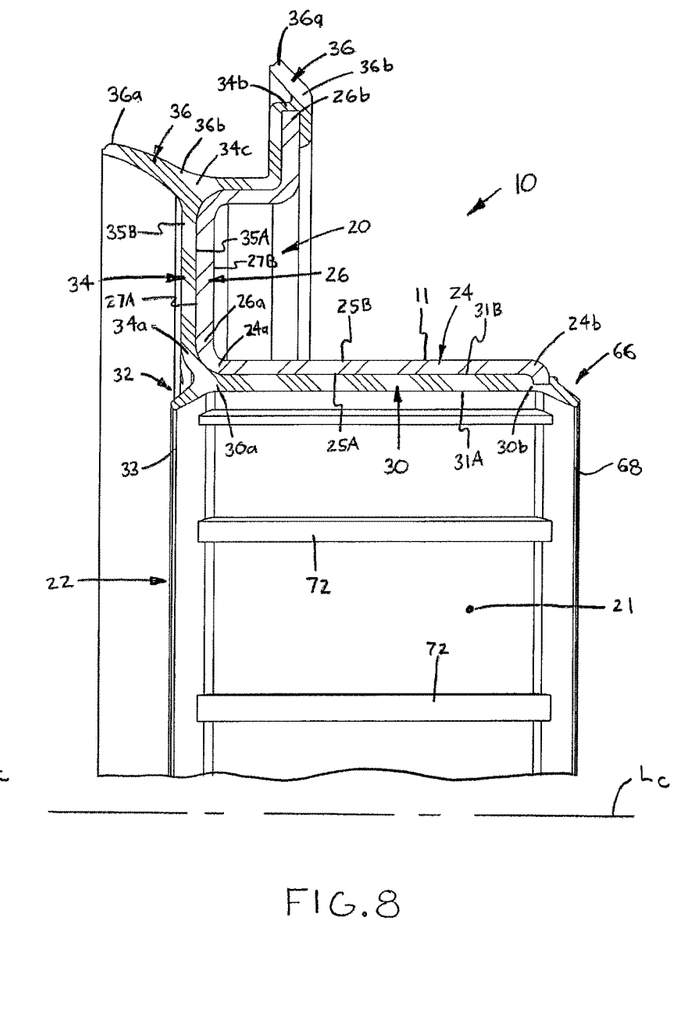
FIG. 8 is a broken-away, axial cross-sectional view of the third construction sleeve.

In any case, the sleeve lip 32 is formed such that the lip sealing surface 33 has an inside diameter $ID_L$ sized less than an outside diameter $OD_S$ (FIG. 1) of the shaft outer surface 1a when the sleeve 10 is separate from the shaft 1, as indicated in FIGS. 4, 6 and 8. As such, the elastomeric material of the lip 32 stretches radially outwardly when the sleeve 10 is installed upon the shaft 1 so that the lip 32 is in tension while the sleeve 10 remains disposed on the shaft 1, i.e., during use of the seal assembly 12. As such, the lip 32 retains sealing efficiency when the effectiveness of other sections of the sleeve elastomeric portion 22 has been reduced, as discussed below.

Referring now FIGS. 2-8, the tubular section 30 of the elastomeric portion 22 preferably further includes at least one annular sealing bead 70 and/or at least one and preferably a plurality of axial ribs 72. Each annular bead 70 extends inwardly from the tubular section inner surface 31A and circumferentially about the centerline $L_C$ and provides a "primary" seal between the sleeve 10 and the shaft 1. Specifically, each annular bead 70 is formed having an inside diameter $ID_B$ (FIGS. 4 and 6) that is less than an outside diameter $OD_S$ (FIG. 1) of the shaft outer surface 1a when the sleeve 10 is separate from the shaft 1. As such, the one or more beads 70 are frictionally and sealingly engaged with the shaft outer surface 1a when the sleeve 10 is installed upon the shaft 1. However, due to the sealing provided by the sleeve lip 32, the amount of interference required between each bead 70 and the shaft 1, or/and the total number of beads 70, can be reduced, thereby decreasing the force necessary to install the sleeve 10 upon the shaft 1.

Figure 7:
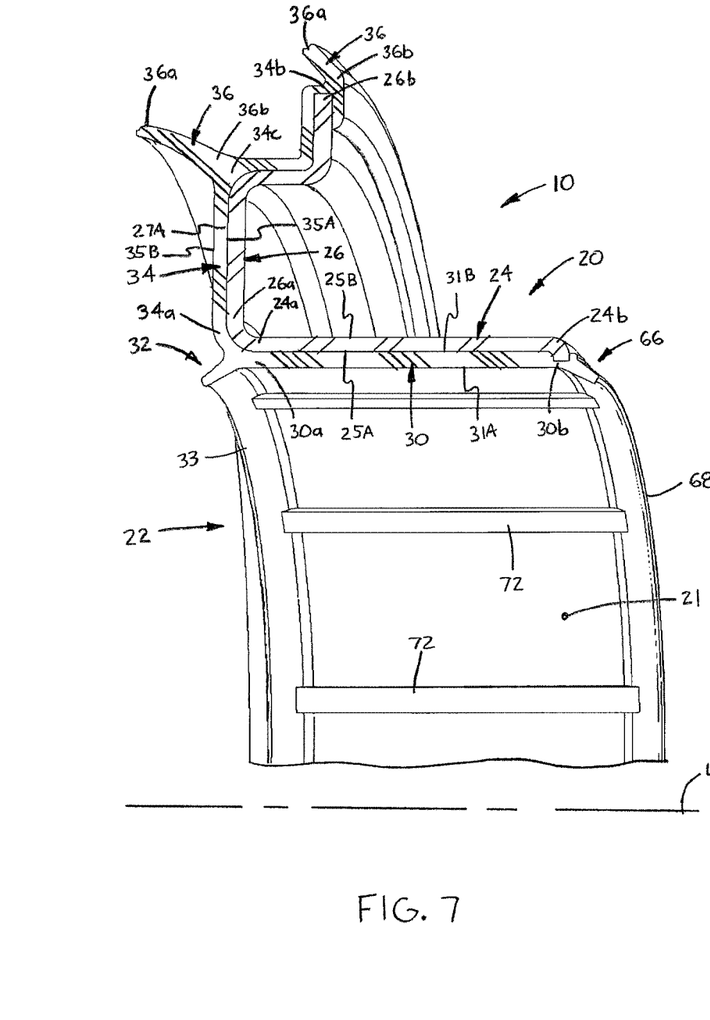
FIG. 7 is a broken-away, axial cross-sectional view in perspective of a third construction of the sleeve.

Alternatively, the elastomeric portion 22 may be formed without any annular sealing bead and instead comprise a second sealing lip 66, as shown in FIGS. 7 and 8. The second sealing lip 66 extends axially outwardly from the second axial end 30b of the elastomeric tubular section 30 so as to be disposed externally of the rigid portion bore 21 on the oil side OS of the seal assembly 12. The second sealing lip 66 has an inner circumferential sealing surface 68 sealingly engageable with the shaft outer surface 1a and functions to prevent fluid on the oil side OS from entering between the sleeve 10 and the shaft 1. As with the first sealing lip 32, the second sealing lip 66 is designed to be in tension when engaged with the shaft 1 for the benefits discussed above and in greater detail below.

Still referring to FIGS. 2-8, each axial rib 72 extends radially inwardly from the inner surface 31A of the elastomeric tubular section 30 and axially along the centerline $L_C$, and may either be substantially straight (i.e., extend primarily along the centerline $L_C$) or curved so as to extend both axially and circumferentially. Preferably, the elastomeric tubular section 30 has a plurality of the axial ribs 72 spaced circumferentially and evenly about the centerline $L_C$, but may alternatively be "clustered" in spaced apart groups of ribs 72, unevenly spaced about the circumference, or the sleeve 10 may only be provided with two or even one rib 72. In all cases, the axial ribs 72 are frictionally engageable with the shaft outer surface 1a and function to prevent relative angular displacement of the sleeve 10 with respect to the shaft 1. In other words, the ribs 72 prevent slippage between the elastomeric tubular section 30 and the shaft outer surface 1a as the shaft 1 rotates about the central axis $A_C$.

Due to the diametrical sizing of the annular beads 70 and the axial ribs 72, each annular bead 70 and each axial rib 72, as well as any part of the main elastomeric tubular section 30 disposed between the rigid tubular section 24 and each annular bead 70 or axial rib 72, is compressed when the sleeve 10 is installed upon the shaft 1. That is, the bead(s) 70 and the rib(s) 72 have inner surfaces (not indicated) each located a lesser distance from the sleeve centerline $L_C$ than the outside diameter $OD_S$ of the shaft outer surface 1a, such that the bead(s) 70 and ribs 72 are compressed between the shaft outer surface 1a and the inner surface 25A of the rigid tubular section 24 when the sleeve 10 is installed on the shaft 1. Because these sections of the elastomeric portion 22 are in compression, the material can develop "compression set" over a period of use of the seal assembly 12, which can reduce the effectiveness of the sealing of the beads 70 and the ribs 72. However, as the sealing lip 32 is located externally of the rigid member bore 21 and remains in tension, the lip 32 retains sealing effectiveness for a substantially greater period of use, and therefore contributes to a greater product life of the seal assembly 12.

Referring now to FIGS. 1-8, as discussed above, the elastomeric portion 22 preferably further includes a radial section 34 extending from the tubular section 30 and attached to the flange 26 of the rigid portion 20. The radial section 34 has an inner end 34a integrally formed with the first axial end 30a of the tubular section 30, an opposing outer radial end 34b and opposing inner and outer radial surfaces 35A, 35B, respectively. The inner radial surface 35A is attached to, preferably bonded to, an adjacent surface 27A of the flange 26 of the rigid portion 20. Preferably, the elastomeric portion 22 further includes at least one and most preferably two dust lips 36 extending from the elastomeric radial section 34, each having a free end 36a engageable with or disposed proximal to the seal outer case 14.

More specifically, one dust lip 36 preferably has an inner end 36b integrally formed with a central region 36c of the elastomeric radial section 34 and extends generally axially, with the free end 36a being engaged with the inner circumferential surface 49A of the closure member 46. The other dust lip 36 has an inner end 36b integrally formed with the outer end 34b of the elastomeric radial section 34 and extends radially outwardly, with its free end 36a being engaged with the inner surface 41A of the case axial portion 40. The two dust lips 36 function to prevent any solid particles (e.g. dust) from entering between the outer case 14 and the sleeve 10 and reaching the seal interface SI. Although the sleeve 10 preferably includes the radial portion 34 with at least one and preferably two dust lips 36, the elastomeric portion 22 may alternatively be formed with a radial portion 34 having no dust lips or three or more dust lips, or even formed without any radial portion.

The present sleeve 10 has a number of advantages over previously known sleeves used with seal assemblies. By providing the external sealing lip 32 functioning in tension, the lip 32 is capable of a greater interference with the shaft 1, is less sensitive to thermal expansion and does not develop compression set. Also, by providing the lip 32, the sleeve 10 may be formed with only a single annular sealing bead 70 (or none) operating in compression, and the amount of interference between the bead(s) 70 and shaft 1 may be reduced, which decreases the force required during installation of the seal assembly 12. Further, as the cantilevered lip 32 does not require grease, allowing grease to be applied only on the oil side OS of the sealing lip 32, avoiding false indications of leakage on the air side AS of the seal assembly. Further, any grease that is applied on a shaft 1 during testing or from shipping plugs is scraped off during installation of the sleeve 10 onto the shaft 1 and remains only on the oil side OS, thereby reducing fouling of test shafts and false indications of leakage of the seal assembly 12.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as generally defined in the appended claims.

We claim:

1. A sleeve for a unitized radial lip seal assembly for sealing an annular space between a shaft and a housing, the shaft having an outer circumferential surface and the seal assembly including an annular primary sealing lip, the sleeve comprising:
    a continuous rigid portion including a tubular section, the tubular section having opposing first and second axial ends, an inner circumferential surface defining a bore for receiving the shaft and an outer circumferential surface providing an engagement surface for the primary sealing lip, and a radial flange extending from the first axial end of the tubular section; and
    an elastomeric portion attached to the continuous rigid portion and including a tubular section, the elastomeric portion tubular section being disposed within the continuous rigid portion bore and having an inner circumferential surface disposeable about the shaft outer surface and opposing first and second axial ends, and a cantilever annular lip extending axially outwardly from the first axial end of the tubular section so as to be substantially disposed externally of the bore of the continuous rigid portion and projecting axially outwardly from a remainder of the sleeve, the lip having an inner circumferential sealing surface sealingly engageable with the shaft outer surface.

2. The sleeve as recited in claim 1 wherein the sleeve is configured to be positioned on the shaft such that the lip of the elastomeric portion is located on an air side of the seal assembly and prevents passage of fluid between the sleeve and the shaft from a liquid side of the seal assembly to the air side.

3. The sleeve as recited in claim 1 wherein the lip has an inner end integrally formed with the first axial end of the tubular section and an opposing, free outer axial end spaced axially outwardly from the tubular section first axial end and providing the lip sealing surface.

4. The sleeve as recited in claim 1 wherein the lip sealing surface is formed on the free end of the lip or the lip includes an annular bead proximal to the free end of the lip and providing the sealing surface.

5. The sleeve as recited in claim 1 wherein the sealing surface of the lip has an inside diameter sized less than an outside diameter of the shaft outer surface when the sleeve is separate from the shaft such that the lip is in tension when the sleeve is disposed about the shaft.

6. The sleeve as recited in claim 1 wherein the tubular section of the elastomeric portion has a centerline and at least one of:
    at least one annular sealing bead extending inwardly from the inner surface and circumferentially about the centerline, the sealing bead being sealingly engageable with the shaft outer surface; and
    at least one axial rib extending radially inwardly from the inner surface and axially along the centerline and configured to prevent relative angular displacement between the sleeve and the shaft.

7. The sleeve as recited in claim 6 wherein the at least one annular bead has an inside diameter less than an outside diameter of the shaft outer surface when the sleeve is separate from the shaft such that the bead sealingly engages with the shaft when the sleeve is installed upon the shaft.

8. The sleeve as recited in claim 6 wherein the at least one annular bead and any part of the elastomeric tubular section disposed between the continuous rigid portion and the at least one annular bead and the at least one axial rib and any part of the elastomeric tubular section disposed between the continuous rigid portion and the at least one axial rib is compressed when the sleeve is installed upon the shaft.

9. The sleeve as recited in claim 1 wherein the sealing lip is a first lip and the elastomeric portion further comprises a second sealing lip extending axially outwardly from the second axial end of the elastomeric tubular section so as to be disposed externally of the continuous rigid portion bore, the second sealing lip having an inner circumferential sealing surface sealingly engageable with the shaft outer surface.

10. The sleeve as recited in claim 1 wherein the elastomeric portion further includes a radial section with an inner end integrally formed with the first axial end of the tubular section, an opposing outer radial end and a radial end surface attached to the flange of the continuous rigid portion.

11. The sleeve as recited in claim 10 wherein the elastomeric portion further includes at least one dust lip extending from the radial section of the elastomeric portion and having a free end engageable with or disposed proximal to an outer case of the seal assembly.

12. The sleeve as recited in claim 1 wherein the continuous rigid portion is formed of a metallic material and the elastomeric portion is bonded to the continuous rigid portion.

13. The sleeve as recited in claim 1 wherein the sealing lip is sized such that the sealing surface of the sealing lip has an inside diameter less than an inside diameter of all remaining sections of the elastomeric portion when the sleeve is separate from the shaft.

14. A unitized radial lip seal assembly for sealing an annular space between a shaft and a housing, the shaft having an outer circumferential surface and the housing having an inner circumferential surface defining a bore, the seal assembly comprising:
    an outer case having an outer annular portion coupleable with the housing and a radially inwardly extending flange portion;
    a primary sealing lip coupled with the flange portion of the outer case; and
    an inner sleeve disposeable about the shaft and including:
    a continuous rigid portion including a tubular section, the tubular section having opposing first and second axial ends, an inner circumferential surface defining a bore and an outer circumferential surface providing an engagement surface for the primary sealing lip, and a radial flange extending from the first axial end of the tubular section; and
    an elastomeric portion attached to the continuous rigid portion and including a tubular section, the elastomeric portion tubular section being disposed within the continuous rigid portion bore and having an inner circumferential surface disposeable about the shaft outer surface and opposing first and second axial ends, and a cantilever annular lip extending axially outwardly from the first axial end of the tubular section so as to be substantially disposed externally of the bore of the continuous rigid portion and projecting axially outwardly from a remainder of the sleeve, the lip having an inner circumferential sealing surface sealingly engageable with the shaft outer surface.

15. The sleeve as recited in claim 14 wherein the sleeve is configured to be positioned on the shaft such that the lip of the elastomeric portion is located on an air side of the seal assembly and prevents passage of fluid between the sleeve and the shaft from a fluid side of the seal assembly to the air side.

16. The sleeve as recited in claim 14 wherein the lip sealing surface is formed on the free end of the lip or the lip includes an annular bead proximal to the free end of the lip and providing the sealing surface.

17. The sleeve as recited in claim 14 wherein the sealing surface of the lip has an inside diameter sized less than an outside diameter of the shaft outer surface when the sleeve is separate from the shaft such that the lip is in tension when the sleeve is disposed about the shaft.

18. The sleeve as recited in claim 14 wherein the tubular section of the elastomeric portion has a centerline and at least one of:
  at least one annular sealing bead extending inwardly from the inner surface and circumferentially about the centerline, the sealing bead being sealingly engageable with the shaft outer surface; and
  at least one axial rib extending radially inwardly from the inner surface and axially along the centerline and configured to prevent relative angular displacement between the sleeve and the shaft.

19. The sleeve as recited in claim 14 wherein at least one of:
  the lip of the elastomeric portion is a first lip and the elastomeric portion further comprises a second sealing lip extending axially outwardly from the second axial end of the elastomeric tubular section so as to be disposed externally of the continuous rigid portion bore, the second sealing lip having an inner circumferential sealing surface sealingly engageable with the shaft outer surface;
  the elastomeric portion further includes a radial section with an inner end integrally formed with the first axial end of the tubular section, an opposing outer radial end and a radial end surface attached to the flange of the continuous rigid portion; and
  the continuous rigid portion is formed of a metallic material and the elastomeric portion is bonded to the continuous rigid portion.

\* \* \* \* \*